1,983,552

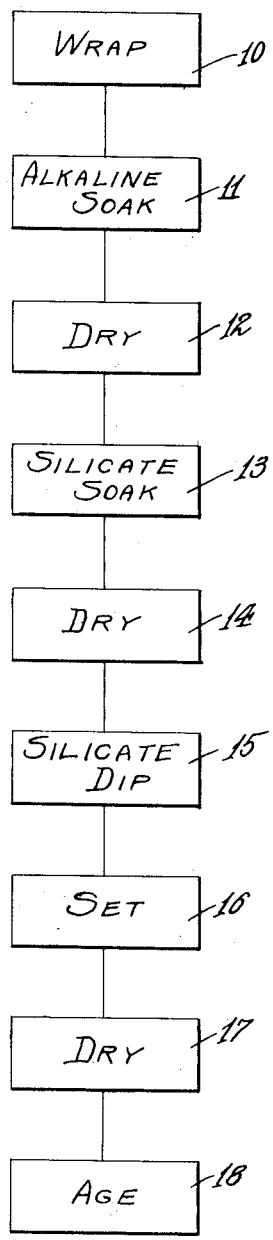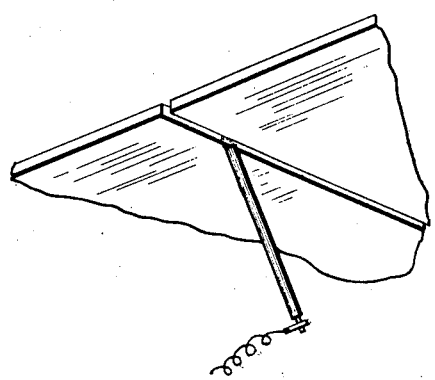
Fig. 2.
Fig. 1.
Inventor
Marcy L. Luckenbaugh
Thomas D. Radcliffe
By Lyon & Lyon
Attorneys Patented Dec. 11, 1934

UNITED STATES PATENT OFFICE 1,983,552

ARC WELDING ELECTRODE AND METHOD OF MAKING THE SAME

Marcy L. Luckenbaugh, Berkeley, Calif., and Thomas D. Radcliffe, Brookville, Pa., assignors to Standard Oil Company of California, San Francisco, Calif., a corporation of Delaware Application March 23, 1929, Serial No 349,313

18 Claims. (Cl. 219—8)

This invention relates to a new and improved type of welding electrodes and to a method of making them, the electrodes being particularly adapted to producing homogeneous, dense welds and having the ability of functioning successfully in side and overhead positions.

For a number of years, it has been known that by coating welding electrodes with various compositions containing silicates, gypsum, paper, yarn and other materials, the quality of the welds produced can be materially increased.

The coated electrodes of the prior art have not been entirely successful, however, as the coating when made of yarn wrapped around the electrode was easily displaced and would unravel during the electric deposition of metal during welding so that the coating was not consumed at a rate equivalent to the rate of consumption of the electrode itself.

Furthermore, the coated electrodes of the prior art did not produce welds of uniform characteristics. The methods of making such prior electrodes were very indefinite and depended a great deal upon arbitrary steps. Moreover, the prior coated electrode would change in character and in efficiency upon storage and no one has disclosed a specific satisfactory method of making an electrode which could be kept in storage for extended periods of time without deterioration.

An object of this invention is to disclose and provide a method of making coated welding electrodes of stable character.

Another object is to disclose and provide a method of coating welding electrodes so as to produce a coating which will not change in character upon extended storage.

Another object is to disclose and provide a method which is relatively simple and at the same time producing an electrode capable of being used with greatly improved results.

An object of this invention is to disclose and provide a coated welding electrode of improved characteristics.

Another object is to disclose and provide a coated welding electrode which may be used in various positions without impairing the quality of the weld or of the deposited metal.

Another object is to disclose and provide a coated welding electrode which may be readily handled, stored and used.

Other objects, advantages and uses of this invention will become apparent to those skilled in the art, from the following detailed description of the preferred method of making coated electrodes and of the resulting product, reference being had to the appended drawing in which:

Figure 1 is a diagrammatic representation or a flow chart of the method which may be employed.

Figure 2 illustrates one position in which the electrode may be used.

One of the primary objects of using coated electrodes during welding operations is to produce an envelope of non-oxidizing vapor around the arc set up between the metal of the electrode and the work so that the deposited metal is free of oxidization and therefore a clean weld free from oxides and other impurities may be obtained.

The coating must necessarily fuse or be vaporized at the temperature of the arc. It has been thought essential that appreciable quantities of water or moisture be present in the coating so as to absorb the heat set up during the welding operation and prevent the coating from vaporizing at a greater speed than that at which the metal is being deposited from the metallic electrode. It has been found, however, that those coatings which contain appreciable quantities of moisture, either as free moisture or as waters of crystallization (such as the water present in coating containing hydrated gypsum) did not produce homogeneous welds, and could not be stored for any length of time without having the characteristics of the electrode materially changed. Furthermore, as has been stated before, the electrodes of the prior art could not be used in inverted or side positions, that is, they could not be used in electro-depositing metal on substantially vertical surfaces, or on ceilings.

It has been discovered that whenever fibrous, cellulosic materials such as cotton or paper are used in the covering or coating of the electrode, the resulting coated electrode does not produce good results. For example, coated electrodes made by winding cotton yarn around the metallic electrode and then smearing them with sodium silicate are very unsatisfactory. We have found, however, that if the yarn or cotton be first treated with an alkaline solution (such as a solution of sodium hydroxide) the various impurities (such as starches) which apparently impair the results, are removed and appreciably better electrodes result.

If this preliminary treatment with an alkaline solution is followed by a careful application of sodium silicate, under conditions of temperature, and concentration in accordance with the hereinafter disclosure, the resulting product is by far much better than any of the electrodes now on the market and will function in a more desirable manner.

As an illustration of our process or method of making coated electrodes, the procedure and materials used in coating carbon steel electric welding rods will be described in detail. The various steps are outlined in Figure 1.

The metallic rods may be first covered with a woven cotton covering or wrapping such as, for example, ordinary white cotton sleeving similar to that used in the electrical industries for insulating purposes. This sleeving is slipped upon the rods and is preferably of such size as to fit the rod closely. In view of the fact that the sleeving is woven and will increase in diameter upon stretching it will adhere to and stay on the rods without any difficulty and during use of the electrode in welding operations will not have a tendency to unravel or unevenly fall away from the metallic rod itself. This sleeving operation occurs at 10 in the diagram, or Figure 1. Preferably about 1" of the surface of the metallic rod is left bare at one end of the rod so as to facilitate subsequent gripping of the electrode by contact points or electrode holders.

At 11, the sleeve covered electrodes are soaked in an alkaline solution. It has been found that a solution containing 10% by weight of sodium hydroxide is suitable.

The sodium hydroxide has a dissolving action on the cotton sleeving or paper, making it soft and removing any sizing or other starchy materials that it may contain. When a solution of the above strength is used, the rods are allowed to soak for a period of about four hours. The alkaline solution may be circulated through the soaking tank so as to wash away soluble impurities and other matter liberated from the wrapping or the wrapping may be subjected to a water wash after the alkaline soak so as to remove any impurities which may be mechanically retained in the wrapping. Naturally, the cotton sleeving may be treated with an alkaline solution before being placed upon the rods, but it has been found more difficult to place treated tubing upon the rods than to place the commercial product thereon and then treat it while in position upon the rods.

After the coated rods have been soaked in 11, they are dried in 12 (which may be any suitable drier or furnace) so as to thoroughly remove all the moisture remaining in the sleeving. It has been found desirable to start the drying operation at a temperature of about 40° C. and then gradually increase the temperature to 110° C., at which temperature the rods are maintained until the moisture has been thoroughly driven out. During the drying step in 12, the rods may be maintained in a vertical position over a hot plate, or they may be placed upon suitable racks and moved into the drier or furnace.

The dry rods are next thoroughly soaked at 13 in a solution of sodium silicate which may be of technical grade. Preferably the solution is about 40° Bé. gravity and about a twelve hour soaking period is normally required to thoroughly saturate the sleeving with the silicate. A solution of potassium silicate can, of course, be substituted for the sodium silicate.

The time of soaking in sodium silicate at 13 will, of course, depend somewhat upon the character of the fibers constituting the wrapping applied at 10. The twelve hour soak mentioned hereinabove is particularly applicable to those forms of braided sleeving made of cotton and shorter periods of soaking may be sufficient when sleeves of more open texture are used.

After the soaking step at 13 the rods and coatings are thoroughly dried by being subjected to substantially the same temperatures as are used during the step indicated at 12. Preferably the drying starts at a temperature of about 40° C. and the temperature gradually increased until about 110° C. is reached. The period of time required for the drying step at 14 depends somewhat upon the character of the wrapping applied at 10 and the quantity of sodium silicate absorbed by the wrapping during the soaking at 13.

After substantially all moisture has been removed from the covering or coating at 14, the rods are dipped in sodium silicate so as to cause further quantities of silicate to adhere to the coating. A soaking is not necessary in step 15 and a mere dipping is sufficient. If, however, an insufficient quantity of sodium silicate is retained upon the rod in a single dip, the rods may be again dried as at 14 and dipped again.

The coating of sodium silicate imparted to the rods during the dipping at 15 is then dried, care being taken that all of the moisture is driven off. Due to the fact that the water glass has a tendency to run off the rods, they should be first put into a drying furnace or oven that has been heated to a temperature of about 180° C. wherein the rods are kept until the silicate is set or ceases to freely run off the rods. This setting operation is indicated in Figure 1 at 16. The dipped rods are maintained at a temperature of about 180° C. only for a sufficient length of time to prevent the coating from dripping or running off the rods.

As soon as the coating has set, the rods are then subjected to a drying operation indicated at 17. During such drying the rods are first subjected to a temperature of about 40° C. and the temperature then gradually raised at intervals of about thirty minutes to 110° C., at which temperature the rods are maintained until all of the moisture present in the coating has been driven off. Normally, only about thirty minutes are required to set the coating of sodium silicate, and it is not desirable to maintain the high initial temperature such as is imparted to the rods at step 16, for an appreciably long time, as the subsequent drying rate is materially reduced and a hard surface is developed upon the rods.

The thoroughly dried rods from step 17 are then aged by being subjected to a warm, dry atmosphere for a period of several days. For example, they may be subjected to a temperature of 125° F. for a period of seven days or more. Preferably the thoroughly dried rods from step 17 are maintained at a temperature of about 125° F. in a dry atmosphere until they are ready for use. This insures that the coated electrodes are of uniform characteristics at the time they are used. The silicate coating has a tendency to absorb moisture rather rapidly and if such coated rods are kept in a humid atmosphere they will deteriorate and become useless for welding purposes.

It has been found that the silicate dip referred to hereinabove and illustrated at 15 may be often eliminated. This, of course, also eliminates the steps at 16 and 17. If the silicate dip 15 is eliminated then the process may consist of steps 10, 11, 12 and 13, followed by steps 16 and 17.

The finished electrode will have a hard, dry, transparent glassy coating on the surface, through which the cotton sleeving or other wrapping material can be easily seen. It will be understood that instead of the cotton sleeving mentioned specifically above, any other woven or braided cellulosic or fibrous material may be used for the wrapping.

The coating, when a cotton sleeving is used, increases the diameter of a ¼″ rod about 1/16″ and rods of smaller and larger diameters are increased proportionately.

The coated welding electrode, made in accordance with the hereinabove described process, produces more homogeneous welds than any electrodes of the prior art. The welds produced are, furthermore, non-porous, and the electrodes may be successfully used in the side and the overhead positions.

Although the detailed description given hereinabove pertains particularly to the manufacture of mild carbon steel electric weld rods, it is to be understood that a similar procedure may be used in making coated welding rods from other metals or alloys.

The invention is not to be limited to the specific process described in detail hereinabove, but includes all such changes and modifications as come within the scope of the following claims.

We claim:

1. The method of making arc welding electrodes comprising covering metallic welding rods with a fibrous cellulosic wrapping, treating the wrapped rods with an alkaline solution so as to purify the same, drying the wrapped rods after such treatment, saturating the dried wrapped rods with a silicate solution, drying the wrapped rods after such saturation by subjecting them to a gradually increasing temperature, dipping the dried rods in a silicate solution, then subjecting the dipped rods to a temperature sufficient to set and harden the surface of liquid silicate adhering to the rods, and finally drying the rods so as to remove all moisture.

2. In a method of making welding electrodes, the steps of covering metallic welding rods with a fibrous cellulosic wrapping, subjecting the wrapped rods to the action of a sodium hydroxide solution, drying the wrapped rods after such treatment with sodium hydroxide solution, saturating the dried rods with a silicate solution, and then drying the rods after such saturation.

3. In a method of making welding electrodes, the step of treating a filamentary cellulosic wrapping for use in coating metallic welding rods with a sodium hydroxide solution, then drying such wrapping and then impregnating the wrapping with sodium silicate.

4. The method of making arc welding electrodes comprising placing a tubular cotton sleeving on metallic welding rods, subjecting the wrapped rods to the action of a solution containing about 10 percent by weight of sodium hydroxide, drying the wrapped rods after such treatment with sodium hydroxide by subjecting them to a gradually increasing temperature, saturating the dried rods with a silicate solution, and then drying the wrapped and saturated rods by subjecting them to a relatively low temperature, then increasing the temperature to over 100° C. and maintaining such temperature until said wrapped rods are substantially moisture free.

5. The method of making arc welding electrodes comprising placing a tubular cotton sleeving on metallic welding rods, subjecting the wrapped rods to the action of a sodium hydroxide solution to remove impurities, drying the wrapped rods after such treatment with sodium hydroxide by subjecting them to a relatively low temperature, then increasing the temperature to over 100° C. and maintaining such temperature until substantially moisture free, then saturating the dried rods with a silicate solution by placing the rods in such solution for a period of several hours, drying the saturated rods by subjecting them to a relatively low temperature, then increasing the temperature to over 100° C. and maintaining such temperature until substantially moisture free, then dipping the dried rods in a silicate solution, then subjecting the dipped rods to a temperature sufficient to set and harden the surface of liquid silicate adhering to the rods, then subjecting the surface-hardened rods to a relatively low temperature, then increasing the temperature to over 100° C. and maintaining such temperature until the rods are substantially moisture free, and then aging the dried rods.

6. The method of making arc welding electrodes comprising covering metallic welding rods with a fibrous cellulosic wrapping, subjecting the wrapped rods to the action of a sodium hydroxide solution to purify the wrapping, thoroughly drying the wrapped rods after such treatment with sodium hydroxide, placing the dried rods in a silicate solution of about 40° Bé. for a period of several hours to saturate the wrapping thereon, drying the wrapped rods after such soaking in silicate by subjecting them to a relatively low temperature, then increasing the temperature to over 100° C. and maintaining such temperature until substantially moisture free, then dipping the dried rods in a silicate solution to coat the same therewith, then subjecting the dipped rods to a temperature of about 180° C. for a period of time sufficient to set the surface of liquid silicate adhering to the rods, and then thoroughly drying the rods by subjecting them to a temperature of below 100° C., and then gradually increasing the temperature.

7. In a method of making welding electrodes, the steps of covering metallic welding rods with a tubular cotton sleeving free from starch and sizing, and impregnating the sleeving with sodium silicate.

8. In a method of making welding electrodes, the steps of covering metallic welding rods with tubular cotton sleeving, then treating the covered rods with an alkaline solution to remove starch and sizing from the cotton sleeving, and finally impregnating the sleeving with sodium silicate.

9. A welding electrode comprising a metallic welding rod having a woven tubular cotton sleeving free from starch and sizing thereon, said sleeving being impregnated and covered with a dense, glassy, moisture free sodium silicate.

10. A welding electrode comprising a metallic core having a purified cellulosic wrapping thereon, saturated and covered with a substantially moisture free silicate.

11. A welding electrode comprising a metallic core having a purified cotton sleeving thereon, saturated and covered with a dense, glassy, moisture free silicate.

12. In a method of making welding electrodes, the steps of covering metallic welding rods with tubular cotton sleeving free from starch and sizing, impregnating the sleeving with sodium silicate, and then removing substantially all moisture from said impregnated sleeve.

13. In a method of making welding electrodes, the steps of treating a substantially cylindrical cellulosic wrapping for use in coating metallic welding rods with a sodium hydroxide solution, then drying such wrapping, and then impregnating the wrapping with sodium silicate.

14. In a method of making welding electrodes, the steps of covering metallic welding rods with a substantially cylindrical woven cellulosic sleeving free from starch and sizing, and impregnating the sleeving with sodium silicate.

15. In a method of making welding electrodes, the steps of covering metallic welding rods with a substantially cylindrical woven cellulosic sleeving, then treating the covered rods with a caustic solution to remove starch and sizing from said sleeving, and finally impregnating the sleeving with sodium silicate.

16. A welding electrode, comprising a metallic welding rod having a woven cellulosic sleeving purified by treatment with caustic thereon, said sleeving being impregnated and covered with a dense glassy and moisture free sodium silicate.

17. A welding electrode, comprising a metallic welding rod having a woven cellulosic sleeving substantially free from starch and sizing thereon, said sleeving being impregnated and covered with a dense glassy moisture free sodium silicate.

18. A welding electrode, comprising a metallic core having a purified cellulosic wrapping substantially free from starch and sizing thereon, said wrapping being saturated and covered with a glassy moisture free silicate.

MARCY L. LUCKENBAUGH.
THOMAS D. RADCLIFFE.